(12) United States Patent
Tamura

(10) Patent No.: US 11,368,832 B2
(45) Date of Patent: *Jun. 21, 2022

(54) COMMUNICATION SYSTEM, OPERATION CONTROL METHOD, AND LOCATION MANAGEMENT SERVER

(71) Applicant: NEC Corporation, Tokyo (JP)

(72) Inventor: Toshiyuki Tamura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/997,923

(22) Filed: Aug. 19, 2020

(65) Prior Publication Data

US 2020/0382940 A1    Dec. 3, 2020

Related U.S. Application Data

(60) Continuation of application No. 16/145,964, filed on Sep. 28, 2018, now Pat. No. 10,785,633, which is a continuation of application No. 13/845,267, filed on Mar. 18, 2013, now Pat. No. 10,111,083, which is a continuation of application No. 13/457,034, filed on Apr. 26, 2012, now abandoned, which is a division of application No. 12/902,975, filed on Oct. 12, 2010, now abandoned, which is a continuation of
(Continued)

(30) Foreign Application Priority Data

Jun. 14, 2006    (JP) ............................. JP2006-164144

(51) Int. Cl.
*H04W 8/06*    (2009.01)
*H04W 8/04*    (2009.01)
*H04W 80/04*   (2009.01)

(52) U.S. Cl.
CPC ............... *H04W 8/04* (2013.01); *H04W 8/06* (2013.01); *H04W 80/04* (2013.01)

(58) Field of Classification Search
CPC ......... H04W 8/04; H04W 8/06; H04W 80/04; H04W 52/0245; H04W 52/0274; H04W 52/028
See application file for complete search history.

(56) References Cited

U.S. PATENT DOCUMENTS 6,058,309 A    5/2000   Huang et al.
6,219,546 B1   4/2001   Valentine
(Continued)

FOREIGN PATENT DOCUMENTS

EP    1089580       4/2001
EP    1089580 A2    4/2001
(Continued)

OTHER PUBLICATIONS

United States Office Action dated Jul. 12, 2013 in U.S. Appl. No. 13/845,267.
(Continued)

*Primary Examiner* — German Viana Di Prisco

(57) ABSTRACT

A method for a base station includes receiving a signal relating to a location of a user equipment (UE) from the UE, selecting a first exchange for the UE and sending the signal to the first exchange, and sending the signal to a second exchange based on subscription information of the UE provided by a server.

4 Claims, 11 Drawing Sheets

Related U.S. Application Data application No. 11/806,955, filed on Jun. 5, 2007, now abandoned.

(56) References Cited

U.S. PATENT DOCUMENTS

| | | | |
|---|---|---|---|
| 6,421,539 | B1 | 7/2002 | Jeong |
| 6,597,910 | B1 | 7/2003 | Ra |
| 7,050,811 | B2 | 5/2006 | Grech et al. |
| 7,193,985 | B1 | 3/2007 | Lewis et al. |
| 7,890,103 | B2 | 2/2011 | Shinozaki |
| 2001/0001090 | A1 | 5/2001 | Harjula |
| 2002/0077134 | A1 | 6/2002 | Mizell et al. |
| 2002/0147023 | A1 | 10/2002 | Sawada et al. |
| 2002/0159420 | A1 | 10/2002 | Naqvi et al. |
| 2004/0067735 | A1* | 4/2004 | Lobley .................. H04W 48/18 455/41.2 |
| 2004/0095881 | A1 | 5/2004 | Borella |
| 2004/0196810 | A1 | 10/2004 | Kil et al. |
| 2004/0202329 | A1 | 10/2004 | Jung et al. |
| 2004/0224682 | A1 | 11/2004 | Kang |
| 2004/0235473 | A1 | 11/2004 | Sanchez |
| 2005/0064889 | A1 | 3/2005 | Haumont |
| 2005/0055220 | A1* | 10/2005 | Lewis .................. H04W 24/10 370/241 |
| 2005/0221823 | A1 | 10/2005 | Noguchi |
| 2005/0227690 | A1 | 10/2005 | Noguchi |
| 2006/0019688 | A1 | 1/2006 | Kil |
| 2006/0092925 | A1 | 5/2006 | Svensson |
| 2006/0099930 | A1 | 5/2006 | Cormier et al. |
| 2006/0120328 | A1 | 6/2006 | Wright et al. |
| 2006/0135157 | A1 | 6/2006 | Baek et al. |
| 2006/0140149 | A1 | 6/2006 | Kim et al. |
| 2006/0182055 | A1 | 8/2006 | Coffee et al. |
| 2006/0286984 | A1 | 12/2006 | Bonner |
| 2008/0002829 | A1 | 1/2008 | Forsberg et al. |
| 2008/0188238 | A1 | 8/2008 | Sawada et al. |
| 2009/0318147 | A1 | 12/2009 | Zhang et al. |

FOREIGN PATENT DOCUMENTS

| | | |
|---|---|---|
| JP | 11-027725 | 1/1999 |
| JP | 2000-0015083 | 3/2000 |
| JP | 2003-534714 | 11/2003 |
| JP | 2006-074404 | 3/2006 |
| JP | 2006-080692 | 3/2006 |
| KR | 2002-0070648 | 9/2002 |

OTHER PUBLICATIONS

United States Office Action dated May 8, 2014 in U.S. Appl. No. 13/845,267.
United States Office Action dated Dec. 11, 2014 in U.S. Appl. No. 13/845,267.
United States Office Action dated Jul. 12, 2016 in U.S. Appl. No. 13/845,267.
United States Office Action dated Apr. 18, 2017 in U.S. Appl. No. 13/845,267.
United States Office Action dated Sep. 6, 2017 in U.S. Appl. No. 13/845,267.
United States Notice of Allowance dated Jun. 21, 2018 in U.S. Appl. No. 13/845,267.
European Search Report dated Feb. 3, 2012.
Ericsson: "CN Centric Load Re-distribution with A/Gb/flex", 3GPP Draft; 82-050715, 3rd Generation Partnership Project (3GPP), Mobile Competence Centre; 650, Route Des Lucioles: F-06921 Sophia-Antipolis Cedex; France, vol. SA WG2, No. Beijing 050331, Mar. 31, 2005.
Japanese Office Action dated Aug. 30, 2011 (with English Translation).
"3GPP TS23.236 V63 0, 5.2 RNC Function", Mar. 2006.
Canadian Office Action dated Feb. 28, 2011.
United States Office Action dated Mar. 12, 2013 in U.S. Appl. No. 13/457,034.
Extended European Search Report dated Oct. 15, 2013.
Extended European Search Report dated Oct. 14, 2013.
3rd Generation Partnership Project; Technical Specification Group Services and System Aspects, 3GPP System Architecture Evolution: Report on Technical Options and Conclusions (Release 7), 3GPP TR 23.882 Vo. 11.0 (Feb. 2006), pp. 1-116.
United States Office Action dated May 20, 2014, in U.S. Appl. No. 13/457,034.
United States Office Action dated Oct. 16, 2013 in U.S. Appl. No. 13/457,034.
Ericsson: "CN Centric Load Re-distribution with A/GB/flex", 3GPP Draft; S2-050715, 3rd Generation Partnership Project (3GPP), Mobile Competence Centre; 650, Route Des Lucioles; F-06921 Sophia-Anti polis Cedex; France, vol. SA WG2, No. Beijing 050331, Mar. 31, 2005.
United States Office Action dated Jul. 12, 2013 in U.S. Appl. No. 13/847,237.
United States Office Action dated May 8, 2014 in U.S. Appl. No. 13/847,237.
United States Office Action dated Dec. 11, 2014 in U.S. Appl. No. 13/847,237.
United States Office Action dated Jul. 12, 2016 in U.S. Appl. No. 13/847,237.
United States Office Action dated Apr. 18, 2017 in U.S. Appl. No. 13/847,237.
United States Office Action dated Sep. 6, 2017 in U.S. Appl. No. 13/847,237.
United States Notice of Allowance dated Jun. 21, 2018 in U.S. Appl. No. 13/847,237.

\* cited by examiner

FIG. 2A

| SUBSCRIBER LOCATION REGISTRATION HISTORY | HISTORY OF BASE STATIONS TO WHICH LOCATION REGISTRATION SIGNALS HAVE BEEN SENT IN THE PAST ONE MONTH<br>TOP TEN BASE STATION NUMBERS AND THE NUMBER OF LOCATION REGISTRATIONS MADE BY THEM |
|---|---|
| SUBSCRIBER OUTGOING CALL HISTORY | TOP TEN NUMBERS MOST FREQUENTLY CALLED BY THE SUBSCRIBER IN THE PAST ONE MONTH AND THE NUMBER OF OUTGOING CALLS TO THOSE NUMBERS |
| SUBSCRIBER INCOMING CALL HISTORY | TOP TEN NUMBERS WHICH HAVE MOST FREQUENTLY CALLED THE SUBSCRIBER IN THE PAST ONE MONTH AND THE NUMBER OF INCOMING CALLS FROM THOSE NUMBERS |
| SERVICE ACTIVATION HISTORY | THE NUMBER OF TIMES A SPECIFIC SERVICE (e.g., CAMEL) HAS BEEN ACTIVATED IN THE PAST ONE MONTH |
| SERVICE SUBSCRIPTION | - WHETHER THE SUBSCRIBER SUBSCRIBES TO A SPECIFIC SERVICE (e.g., CAMEL)<br>- WHETHER THE SUBSCRIBER SUBSCRIBES TO TELEPHONE RATE DISCOUNT FOR SPECIFIC SUBSCRIBERS (e.g., A FAMILY PLAN) AND AGWs ACCOMMODATING SPECIFIC SUBSCRIBERS<br>- WHETHER THE SUBSCRIBER SUBSCRIBES TO A TRUNK NETWORK OPERATOR |

FIG 2B

| LOCATION INFORMATION | INFORMATION ON LOCATION OF A BASE STATION THE AGW CAN ACCOMMODATE IN THE SHORTEST CHANNEL ON NETWORK |
|---|---|
| INFORMATION ON EXTERNAL NETWORKS INTERFACED BY THE AGW | - INFORMATION ON TRUNK GROUPS INTERFACED BA THE AGW<br>- INFORMATION ON THE AGW's CAPABILITY TO PROVIDE SPECIFIC SERVICES<br>- AGW CAPABILITY AND THE NUMBER OF SUBSCRIBERS CURRENTLY ACCOMMODATED BY IT (WHICH ARE USED FOR CAPACITY EVALUATION)<br>- OTHER (e.g., WHETHER THE AGW IS PLANNED TO BE MOVED) |

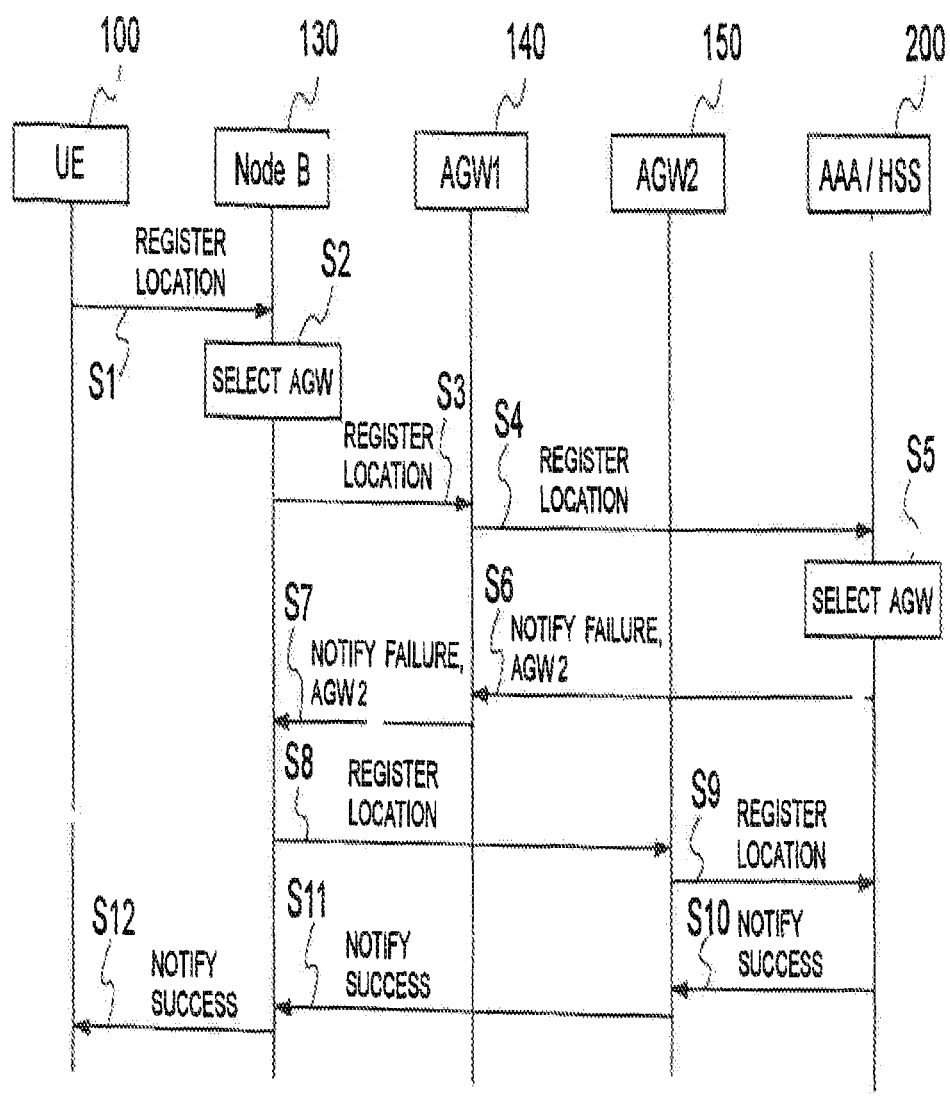

COMMUNICATION SYSTEM, OPERATION CONTROL METHOD, AND LOCATION MANAGEMENT SERVER

This application is a Continuation Application of U.S. patent application Ser. No. 16/145,964, filed on Sep. 28, 2018, which was a Continuation Application of U.S. patent application Ser. No. 13/845,267 (now U.S. Pat. No. 10,111,083), filed on Mar. 18, 2013, which was a Continuation Application of U.S. patent application Ser. No. 13/457,034 (Now Abandoned), filed on Apr. 26, 2012; which is a Divisional Application of U.S. patent application Ser. No. 12/902,975 (Now Abandoned), filed on Oct. 12, 2010, which is a Continuation Application of patent application Ser. No. 11/806,955 (Now Abandoned), filed on Jun. 5, 2007, which was based upon and claims the benefit of priority from Japanese patent application No. 2006-164144, filed on Jun. 14, 2006, the entire contents of all of which are incorporated herein by reference.

BACKGROUND OF THE INVENTION

Field of the Invention

The present invention relates to a communication system, an operation control method, and a location management server. More particularly, the present invention relates to a communication system in which base stations and access gateways (AGWs) are configured in an Internet Protocol (IP) mesh network.

Related Art

In a case a base station (also referred to as a "Node B") and an AGW as an exchange for accommodating a mobile station (also referred to as a "User Equipment" or "UE") which is a portable telephone subscriber are configured in an IP mesh network, when the mobile station moves into an area covered by the base station, the mobile station transmits a location registration signal to the base station. The base station then selects an AGW, which is at a level above the base station, according to its own logic. For example, the base station may decide an AGW for accommodating the mobile station based on a certain bit array representing the International Mobile Subscriber Identity (IMSI) of the mobile station contained in the location registration signal.

The base station then transmits a location registration signal to the AGW selected for accommodating the mobile station and the AGW transmits a location registration signal to an Authentication, Authorization, Accounting/Home Subscriber Server (AAA/HSS) which is a location management server at a level above the AGW. In response to the location registration signal from the AGW accommodating the mobile station, the AAA/HSS makes location registration for the mobile station and manages its location (see "3GPP TR 23.882 V0.11.0 3GPP System Architecture Evolution: Report on Technical Options and Conclusions (Release 7)", February 2006 and "3GPP TS 23.236 V6.3.0, 5.2 RNC Functions", March 2006, for example).

A first problem is that in such a communication system with base stations and AGWs being configured in an IP mesh network, a mobile station basically continues to use an AGW to which it initially registers its location and there is no mechanism that enables users to fully enjoy flexibility of a network which allows free combination of a base station and an AGW.

A second problem is that due to lack of such a mechanism for enabling users to fully enjoy flexibility of a network which allows free combination of a base station and an AGW, the AGWs have to support every service provided by portable telephone carrier networks.

SUMMARY OF THE INVENTION

It is an exemplary object of the invention to provide a communication system, an operation control method, and a location management server for enabling efficient operation and management of networks by utilizing flexibility of a network which allows free combination of a base station and an AGW.

A communication system according to an exemplary aspect of the present invention is a communication system including a location management server for managing the location of a mobile station, a base station for deciding an exchange which accommodates the mobile station via the base station in response to a location registration request from the mobile station and making the location registration request to the exchange decided, and an exchange for making the location registration request to the location management server in response to the location registration request from the base station, wherein the location management server designates an exchange for accommodating the mobile station in response to the location registration request.

An operation control method according to an exemplary aspect of the present invention is an operation control method for a communication system which includes a location management server for managing the location of a mobile station, a base station for deciding an exchange which accommodates the mobile station via the base station in response to a location registration request from the mobile station and making the location registration request to the exchange decided, and an exchange for making the location registration request to the location management server in response to the location registration request from the base station, the method including, at the location management server, designating an exchange for accommodating the mobile station in response to the location registration request.

A location management server according to an exemplary aspect of the present invention is a location management server for a communication system which includes a location management server for managing the location of a mobile station, a base station for deciding an exchange which accommodates the mobile station via the base station in response to a location registration request from the mobile station and making the location registration request to the exchange decided, and an exchange for making the location registration request to the location management server in response to the location registration request from the base station, wherein the location management server designates an exchange for accommodating the mobile station in response to the location registration request.

A storage medium according to an exemplary aspect of the present invention is a storage medium storing a program for causing a computer to execute an operation control method for a location management server of a communication system which includes a location management server for managing the location of a mobile station, a base station for deciding an exchange which accommodates the mobile station via the base station in response to a location registration request from the mobile station and making the location registration request to the exchange decided, and an exchange for making the location registration request to the location management server in response to the location registration request from the base station, wherein the program including a process of designating an exchange for accommodating the mobile station in response to the location registration request.

BRIEF DESCRIPTION OF THE DRAWINGS

FIGS. 2A and 2B show exemplary databases possessed by the AAA/HSS of FIG. 1, FIG. 2A showing an example of a subscriber database and FIG. 2B showing an example of an AGW database;

FIG. 3 shows a sequence diagram illustrating operations of deciding an AGW when the mobile station of FIG. 1 makes location registration;

DETAILED DESCRIPTION OF EXEMPLARY EMBODIMENTS

Exemplary embodiments of the invention will be described follow with reference to drawings.

Figure 1:
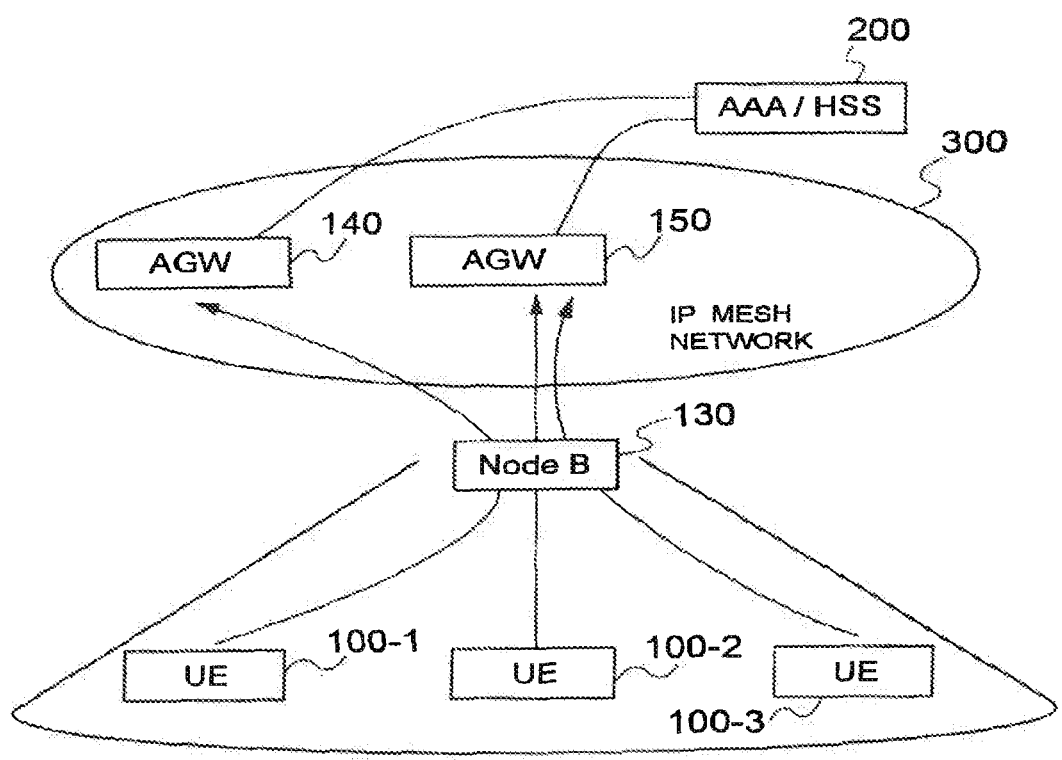
FIG. 1 shows the configuration of a communication system according to an exemplary embodiment of the invention.

FIG. 1 shows the configuration of a communication system according to a first exemplary embodiment of the invention. Referring to FIG. 1, the communication system according to the first exemplary embodiment of the invention includes mobile stations 100-1 to 100-3 which are potable telephone subscribers, a base station 130 accessed by the mobile stations, AGWs 140 and 150 which accommodate the mobile stations, and an AAA/HSS 200 which manages subscriber data. The base station 130 and the AGWs 140 and 150 are configured in an IP mesh network 300.

FIG. 1 shows that the mobile stations 100-1 to 100-3 move into an area covered by the base station 130. When a base station and AGWs are configured in an IP mesh network, an AGW is basically not changed along with movement of a mobile station. This is a mechanism effective for reducing mobility management signals. Meanwhile, a potential of a base station and AGWs being configured in an IP mesh network is that combination of nodes can be freely set. The first exemplary embodiment combines this flexibility of a network and various databases provided by the AAA/HSS 200 to enable efficient operation and management of networks.

FIGS. 2A and 2B show exemplary databases possessed by the AAA/HSS 200 of FIG. 1, FIG. 2A showing an example of a subscriber database and FIG. 2B showing an example of an AGW database. The AAA/HSS 200 can use such databases as shown in FIG. 2 to designate an AGW for accommodating a mobile station.

The operation of the communication system according to the first exemplary embodiment of the invention will be described below with reference to drawings. FIG. 3 shows a sequence diagram illustrating operations of deciding an AGW when the mobile station 100 makes location registration.

In FIG. 3, when the mobile station 100 moves into the coverage of the base station 130, the mobile station 100 transmits a location registration signal to the network to request location registration (step S1). Upon receiving the signal, the base station 130 selects an AGW for the mobile station 100 according to its own logic (step S2). For example, the base station 130 may decide an AGW for accommodating the mobile station 100 based on a certain bit array representing the IMSI of the mobile station 100 contained in the location registration signal.

Assuming that the AGW 140 is selected at step S2, the base station 130 transmits a location registration signal to the AAA/HSS 200 via the AGW 140 (steps S3 and S4). The operations so far are conventional procedures. As an operation characteristic to the exemplary embodiment, the AAA/HSS 200 determines at step S5 whether it is appropriate for the AGW 140 to accommodate the mobile station 100 by utilizing various databases the AAA/HSS 200 possesses.

FIG. 3 shows operations for a case it is determined that the mobile station 100 should be accommodated by the AGW 150, not the AGW 140. This determination is notified to the base station 130 via the AGW 140 as a failure notification indicating failure of location registration (steps S6 and S7). To this notification, information on an AGW which should accommodate the mobile station 100 (i.e., the AGW 150) is added, so that the base station 130 can again continue location registration for the AGW 150 utilizing the information.

That is, the base station 130 transmits a location registration signal to the AAA/HSS 200 via the AGW 150 (steps S8 and S9). The AAA/HSS 200 then makes location registration for the mobile station 100 in response to the location registration signal from the AGW 150, enabling the mobile station 100 to be accommodated by the intended AGW 150 as requested by the AAA/HSS 200. The location registration is completed by the AAA/HSS 200 notifying the mobile station 100 of success of location registration via the AGW 150 and the base station 130 (steps S10, S11 and S12).

On the other hand, if it is determined at step S5 that the mobile station 100 should be accommodated by the AGW 140, location registration for the mobile station 100 is made in response to a location registration signal from the AGW 140 and the processes at steps S6 through S9 are not performed.

Now, operations for moving the mobile station 100 which is already accommodated by an AGW to another AGW will be described with reference to FIG. 4.

Figure 4:
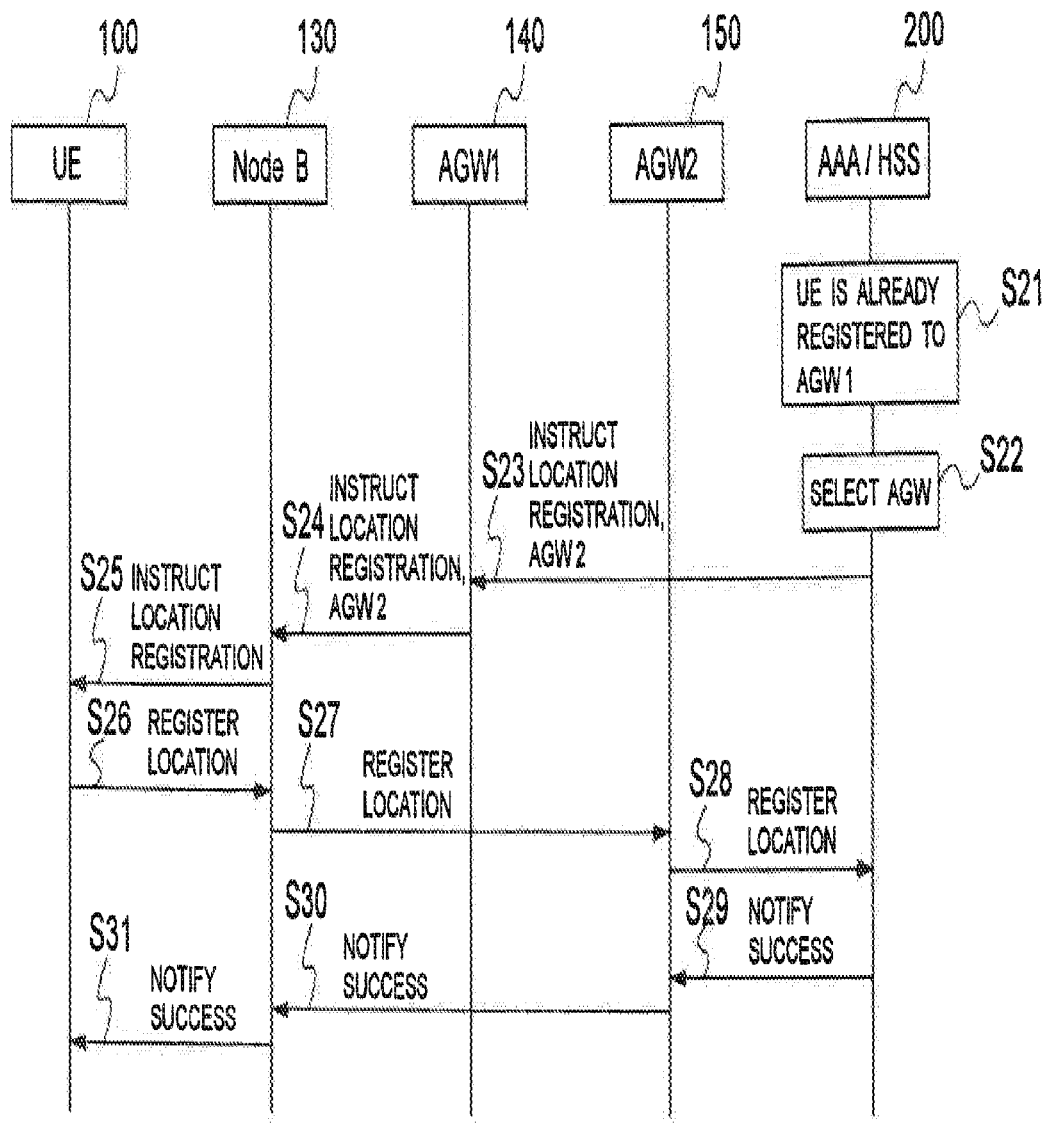
FIG. 4 shows a sequence diagram illustrating operations of moving the mobile station of FIG. 1 already accommodated by an AGW to another AGW.

FIG. 4 shows operations for when a portable telephone carrier changes an AGW accommodating the mobile station 100 due to network start-up. The series of operations can be performed in response to movement of subscribers due to addition or reduction of AGWs, accommodation of a mobile station to the same AGW as a communication party with which it frequently communicates, and/or adjustment of load balancing among AGWs.

FIG. 4 assumes that the mobile station 100 has already gone through location registration and is now accommodated by the AGW 140 (step S21). When the portable telephone carrier instructs the AAA/HSS 200 to change the AGW accommodating the mobile station 100, the AAA/HSS 200 decides an AGW which should accommodate the mobile station 100 in a similar manner to step S5 of FIG. 3 (step S22).

If it is determined that the mobile station 100 should be accommodated by the AGW 150, the AAA/HSS 200 transmits a change instruction signal (or a location registration instruction signal) to which information on the AGW 150 is added to the base station 130 via the AGW 140 (steps S23 and S24). The base station 130 in turn transmits a change instruction signal not containing the AGW information to the mobile station 100 (step S25).

Upon receiving the change instruction signal, the mobile station 100 transmits a location registration signal to the network (step S26), but the base station 130 which has received the signal transmits a location registration signal to the AGW 150 based on the AGW information contained in the change instruction signal received at step S24 (step S27). The AAA/HSS 200 receives the location registration signal from the AGW 150 (step S28) and makes location registration for the mobile station 100, enabling the mobile station 100 to be accommodated by the intended AGW 150 as requested by the AAA/HSS 200. The location registration is completed by the AAA/HSS 200 notifying the mobile station 100 of success of location registration via the AGW 150 and the base station 130 (steps S29, S30 and S31).

Figure 5:
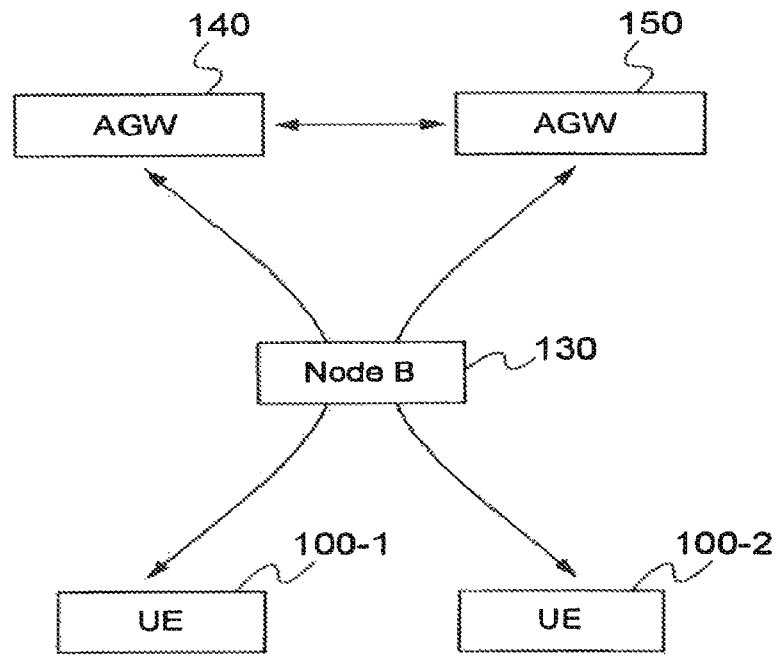
FIG. 5 illustrates communication channels before the AGWs accommodating the mobile stations of FIG. 1 are reselected.
Figure 6:
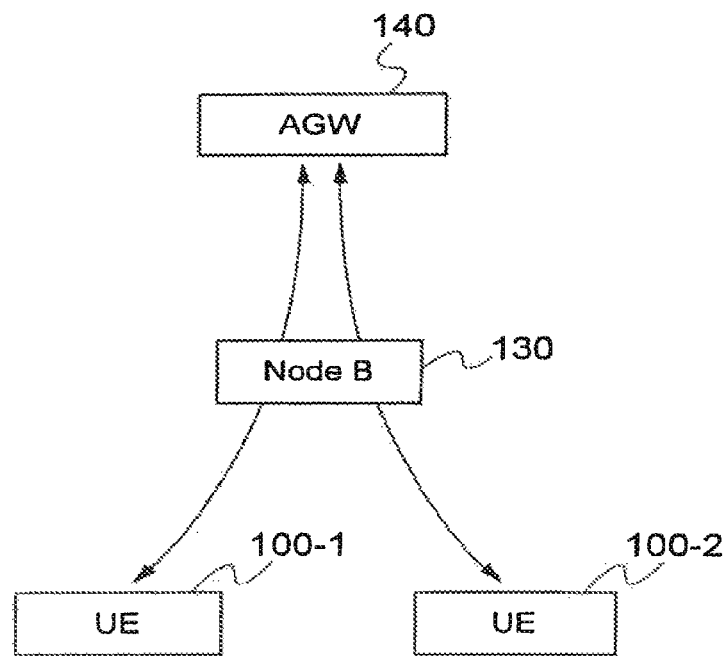
FIG. 6 illustrates communication channels after reselection of AGWs accommodating the mobile stations of FIG. 1.

A communication system according to a second exemplary embodiment of the invention will be now described. With reference to FIGS. 5 and 6, a case will be described where an AGW for accommodating a mobile station is reselected in the communication system according to the second exemplary embodiment of the invention. FIG. 5 illustrates a case where mobile stations 100-1 and 100-2 subscribe to a service such as a family plan together and frequently make phone calls to each other but are accommodated by different AGWs 140 and 150.

In this case, it is necessary to establish a communication channel between the AGWs 140 and 150 which accommodate the mobile stations 100-1 and 100-2 respectively. FIG. 6 shows a situation after the mobile stations 100-1 and 100-2 are re-accommodated by the same AGW (here the AGW 140) in accordance with the procedure shown in FIG. 3 or 4. In FIG. 6, since the mobile stations 100-1 and 100-2 are now accommodated by the same AGW 140, the communication channel established between the AGWs 140 and 150, which is required in FIG. 5, is no longer necessary, so that communication channels can be established more efficiently.

In this case, the AAA/HSS 200 decides an AGW which should accommodate the mobile station 100 based on information on the mobile station 100 stored in the subscriber database shown in FIG. 2A at step S5 in FIG. 3 or S22 in FIG. 4. To be specific, as shown in FIG. 2A, the subscriber database stores, for each mobile station, information on whether or not it subscribes to any telephone rate discount for specific subscribers (e.g., a family plan), and if it does, information on AGWs which accommodate specific subscribers. Thus, when reference to the subscriber database shows that the mobile station 100 subscribes to a family plan service, the AAA/HSS 200 decides that an AGW which accommodates a specific subscriber (i.e., a mobile station which subscribes to the family plan service with the mobile station 100) should accommodate the mobile station 100.

Figure 7:
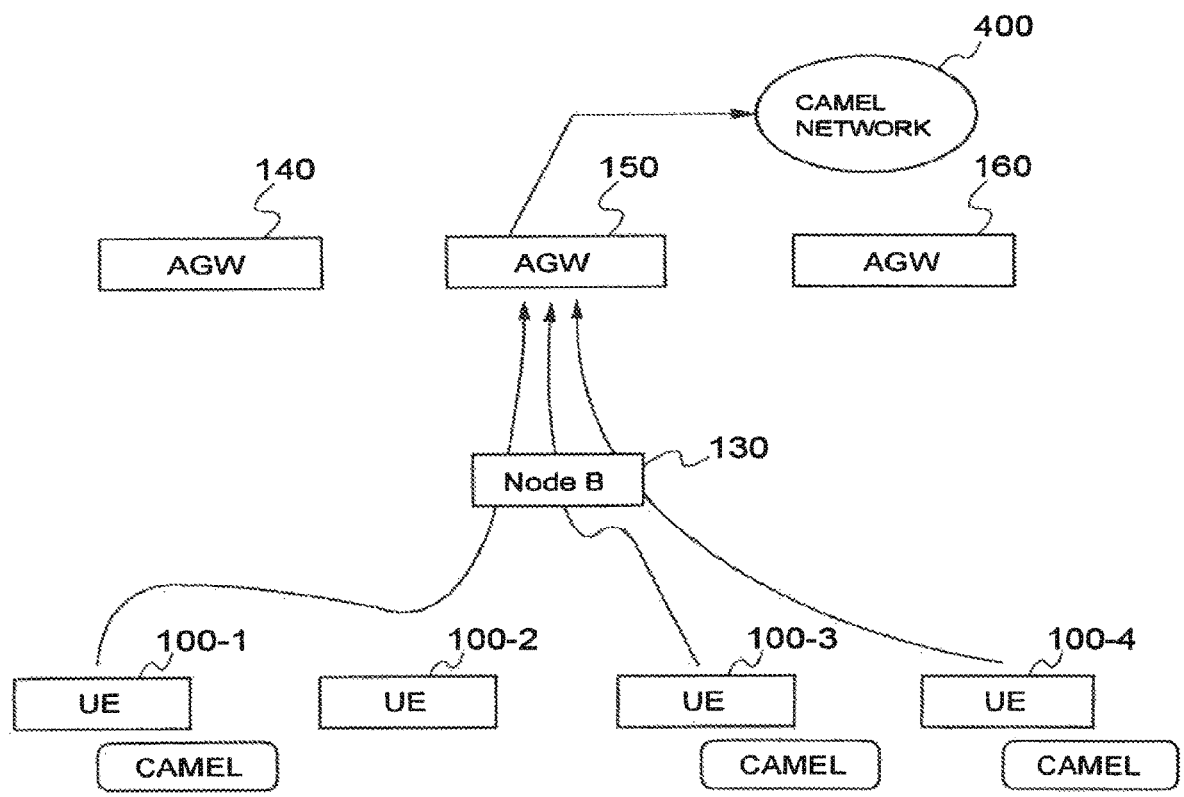
FIG. 7 shows an example of mobile stations that subscribe to CAMEL services in FIG. 1 being accommodated by the same AGW.

A communication system according to a third exemplary embodiment of the invention will be described next. The second exemplary embodiment has illustrated a case where mobile stations subscribe to a family plan service as an instance of deciding an AGW for accommodating a mobile station based on service to which the mobile station subscribes, whereas the third exemplary embodiment will discuss a case where mobile stations subscribe to Customized Applications for Mobile network Enhanced Logic (CAMEL) services with reference to FIG. 7. In FIG. 7, mobile stations 100-1, 100-3 and 100-4 subscribe to CAMEL services. Only the AGW 150 is connected to a CAMEL network 400 and thus can provide CAMEL services.

FIG. 7 illustrates a case where the AAA/HSS 200 decides AGWs for accommodating the mobile stations with their subscription to CAMEL services as a determination condition in accordance with the procedure shown in FIG. 3 or FIG. 4; the mobile stations 100-1, 100-3 and 100-4 which subscribe to CAMEL services are accommodated by the AGW 150 capable of providing CAMEL services. It is accordingly possible to make different functions be provided by the AGWs and/or to limit external networks to which the AGWs connect, which can reduce network infrastructure costs.

In this case, the AAA/HSS 200 decides an AGW which should accommodate the mobile station 100 at step S5 in FIG. 3 or S22 in FIG. 4 based on information on the mobile station 100 stored in the subscriber database of FIG. 2A and information on each AGW stored in the AGW database shown in FIG. 2B. Specifically, the subscriber database stores information on subscription of each mobile station to specific services as illustrated in FIG. 2A and the AGW database stores information on each AGW's capability to provide a particular service as illustrated in FIG. 2B. Thus, with reference to the subscriber database and the AGW database, if the mobile station 100 subscribes to a CAMEL service, the AAA/HSS 200 decides that an AGW capable of providing CAMEL services should accommodate the mobile station 100.

As a communication system according to a fourth exemplary embodiment of the invention, an AGW may also be decided based on a codec implemented in a mobile station. For example, to make a video telephone call, a codec dedicated to video telephone is required of an AGW, so that a mobile station capable of video telephone and subscribing to a video telephone service is accommodated by an AGW which implements a video telephone codec. Consequently, an AGW which accommodates only mobile stations without video telephone capability does not have to implement a video telephone codec, thus equipment investment can be reduced.

In this case, the AAA/HSS 200 decides an AGW which should accommodate the mobile station 100 at step S5 in FIG. 3 or S22 in FIG. 4 based on information on the mobile station 100 stored in the subscriber database of FIG. 2A and information on each AGW stored in the AGW database of FIG. 2B. Specifically, the subscriber database stores information on subscription of each mobile station to specific services as illustrated in FIG. 2A and the AGW database stores information on each AGW's capability to provide a particular service as illustrated in FIG. 2B. Thus, with reference to the subscriber and AGW databases, if the mobile station 100 subscribes to a video telephone service, the AAA/HSS 200 decides that an AGW capable of providing a video telephone service should accommodate the mobile station 100.

Figure 8:
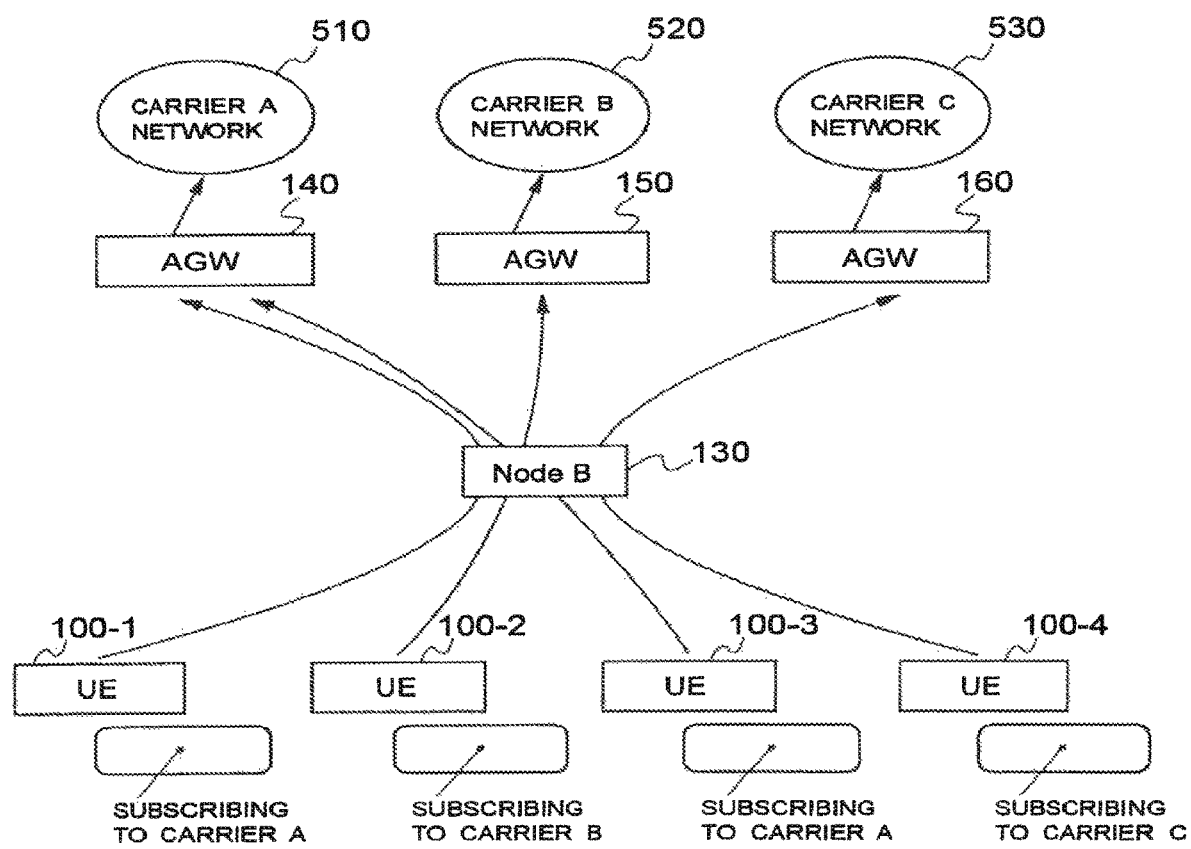
FIG. 8 shows an example of deciding AGWs for accommodating mobile stations based on telecommunication carriers supplying a trunk network to which the mobile stations subscribe in FIG. 1.

A communication system according to a fifth exemplary embodiment of the invention will be described next. Description will be given of a case where an AGW for accommodating a mobile station is decided based on a telecommunication carrier supplying a trunk network to which the mobile station subscribes with reference to FIG. 8. In FIG. 8, mobile stations 100-1 and 100-3 subscribe to a carrier A which provides a carrier A network 510, a mobile station 100-2 to a carrier B which provides a carrier B network 520, and a mobile station 100-4 to a carrier C which provides a carrier C network 530. Only the AGW 140 is connected to the carrier A network 510, only the AGW 150 is connected to the carrier B network 520, and only an AGW 160 is connected to the carrier C network 530.

FIG. 8 illustrates a case where AGWs for accommodating the mobile stations are decided based on a telecommunication carrier supplying a trunk network to which the mobile stations subscribe as a determination condition in accordance with the procedure shown in FIG. 3 or FIG. 4. The mobile stations 100-1 and 100-3 are accommodated by the AGW 140, the mobile station 100-2 by the AGW 150, and the mobile station 100-4 by the AGW 160. This makes it possible to establish efficient networks by limiting external networks to which the AGWs connect or to establish an efficient transmission channel when an AGW connects to an external network.

In this case, the AAA/HSS 200 decides an AGW which should accommodate the mobile station 100 based on information on the mobile station 100 stored in the subscriber database of FIG. 2A and information on each AGW stored in the AGW database shown in FIG. 2B at step S5 in FIG. 3 or S22 in FIG. 4. Specifically, the subscriber database stores information on subscription of each mobile station to a trunk network operator as shown in FIG. 2A and the AGW database stores information on each AGW's capability to provide a particular service as shown in FIG. 2B. Accordingly, with reference to the subscriber database and the AGW database, if the mobile station 100 subscribes to a telecommunication carrier supplying a trunk network, the AAA/HSS 200 decides that an AGW which is connected to the trunk network provided by the carrier should accommodate the mobile station 100.

A communication system according to a sixth exemplary embodiment of the invention will be described next. In the sixth exemplary embodiment, the AAA/HSS 200 decides an AGW for accommodating a mobile station based on the status of mobile station accommodation by AGWs. Specifically, the AAA/HSS 200 decides an AGW which should accommodate the mobile station 100 based on information on each AGW stored in the AGW database of FIG. 2B at step S5 in FIG. 3 or S22 in FIG. 4.

As illustrated in FIG. 2B, the AGW database stores information on the capability of each AGW (i.e., the maximum number of subscribers it can accommodated) and the number of currently accommodated subscribers. Thus, if the AAA/HSS 200 determines from reference to the AGW database that the mobile station 100 should be accommodated by a different AGW than the one which requested location registration at step S4 in FIG. 3 (or the one currently accommodating the mobile station 100) for the purpose of keeping load balancing among AGWs uniform, it decides that the different AGW should accommodate the mobile station 100.

A communication system according to a seventh exemplary embodiment of the invention will be described next. In the seventh exemplary embodiment, the AAA/HSS 200 decides that an AGW which has the shortest communication channel to the base station which requested location registration at step S3 in FIG. 3 should accommodate the mobile station 100. That is, the AAA/HSS 200 decides an AGW which should accommodate the mobile station 100 based on information on each AGW stored in the AGW database of FIG. 2B at step S5 in FIG. 3 or S22 in FIG. 4.

Specifically, as illustrated in FIG. 2B, the AGW database stores information on the location of a base station each AGW can accommodate in the shortest channel on the network. In other words, the AGW database shows, for each AGW, a base station the AGW can accommodate in the shortest channel on the network being associated with each other. Thus, the AAA/HSS 200 decides that an AGW associated with the base station which requested location registration at step S3 in FIG. 3 should accommodate the mobile station 100.

Now, a communication system according to an eighth exemplary embodiment of the invention will be described. The second to seventh exemplary embodiments decide an AGW for accommodating a mobile station using one determination condition, such as a service to which the mobile station subscribes and status of mobile station accommodation by AGWs, whereas the eighth exemplary embodiment decides an AGW for accommodating a mobile station using a number of determination conditions in combination.

Figure 9:
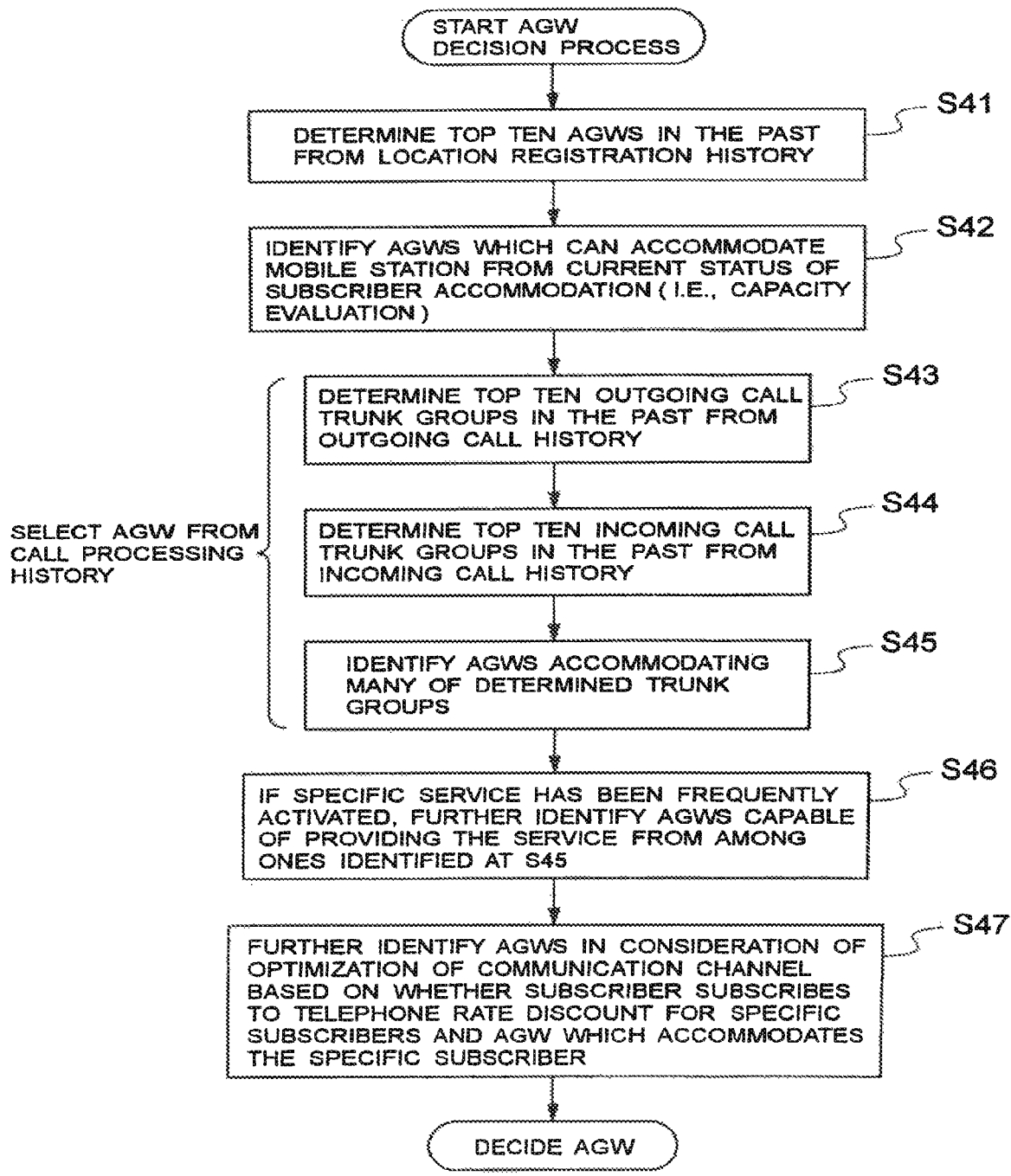
FIG. 9 shows a flowchart illustrating an example of deciding an AGW for accommodating a mobile station with a number of determination conditions in combination.

FIG. 9 shows a flowchart illustrating operations in the eighth exemplary embodiment of the invention for deciding an AGW for accommodating a mobile station using a number of determination conditions in combination, the procedure shown in FIG. 9 being performed at step S5 in FIG. 3 or S22 in FIG. 4. First, based on history of subscriber location registration for the mobile station 100 stored in the subscriber database shown in FIG. 2A, the AAA/HSS 200 determines base stations to which the mobile station 100 have frequently made location registration, e.g., the top ten base stations, and determines AGWs associated with those base stations based on base station location information for each AGW stored in the AGW database of FIG. 2B (step S41).

Then, the AAA/HSS 200 identifies AGWs which can accommodate the mobile station 100 from among the ones determined at step S41 based on each AGW's capability (i.e., the maximum number of subscribers the AGW can accommodate) and the number of subscribers currently accommodated by it, which are stored in the AGW database of FIG. 2B (step S42).

The AAA/HSS 200 then determines outgoing call trunk groups each corresponding to outgoing call numbers which have been frequently called by the mobile station 100, e.g., the top ten most frequently called numbers, based on the subscriber outgoing call history for the mobile station 100 which is stored in the subscriber database of FIG. 2A. In other words, the AAA/HSS 200 determines outgoing call trunk groups which have been used in outgoing calls from the mobile station 100 to those ten numbers (step S43). The AAA/HSS 200 also determines incoming call trunk groups each corresponding to incoming call numbers from which a call has been frequently made to the mobile station 100, e.g., the numbers of the top ten most frequent incoming calls, based on the subscriber incoming call history for the mobile station 100 stored in the subscriber database of FIG. 2A. In other words, the AAA/HSS 200 determines incoming call trunk groups that have been used in incoming calls to the mobile station 100 from those ten numbers (step S44).

Then, the AAA/HSS 200 identifies AGWs which accommodate many of the outgoing call trunk groups determined at step S43 and the incoming call trunk groups determined at step S44 from among the AGWs determined at step S42 based on information on trunk groups interfaced by each AGW, which is stored in the AGW database of FIG. 2B (step S45).

Then, based on service activation history for the mobile station 100 stored in the subscriber database of FIG. 2A, the AAA/HSS 200 determines whether CAMEL services have been frequently activated, for example. If CAMEL services have been activated more then a predetermined number of times, the AAA/HSS 200 identifies AGWs which can provide CAMEL services from among the ones determined at step S45 based on information on each AGW's capability to provide a particular service, which is stored in the AGW database of FIG. 2B (step S46).

The AAA/HSS 200 further narrows the AGWs determined at step S46 to decide an AGW for accommodating the mobile station 100 taking into consideration an effect of optimizing the communication channel to an AGW which accommodates the other party if the mobile station 100 subscribes to a family plan service, based on whether the mobile station 100 subscribes to telephone rate discount for specific subscribers (e.g., a family plan) and AGWs accommodating specific subscribers which are stored in the subscriber database of FIG. 2A (step S47). If the AGWs determined at step S46 include an AGW which accommodates the party which subscribes to the family plan service with the mobile station 100, the AAA/HSS 200 preferably decides that the AGW should accommodate the mobile station 100 at step S47 in terms of optimization of the communication channel between them and have the mobile station 100 and the other party be accommodated by the same AGW.

Hereinafter, a ninth exemplary embodiment of the invention will be described with reference to drawings.

The ninth exemplary embodiment introduces the MME (Mobility Management Entity)/UPE (User Plane Entity) selection procedure.

In the current TR (Technical Report) 23.882, the MME/UPE initiated reattach procedure is described in the section 7.13.2. This procedure is designed aiming for MME/UPE load redistribution, and also to configure more topologically optimal based on the current user location.

Because of the introduction of S1 flex in the SAE (System Architecture Evolution) architecture, any MME/UPE can be chosen within operator's network whenever topologically reachable from the eNodeB (Enhanced Node B). This network topology provides the significant benefit for mobility management point of view since a UE (User Equipment) can stay the same MME/UPE for a long time where ever a UE stays within its network. However, this flexibility may cause the biased MME/UPE load distribution unless sophisticated MME/UPE load distribution mechanism should be designed for SAE architecture from the beginning.

MME/UPE selection mechanism by HSS (Home Subscriber Server) follows.

Currently the TR 23.882 specifies only reattach procedure. This mechanism provides the load redistribution function on the particular MME/UPE for maintenance purpose. However, this mechanism is not enough to make a dynamic MME/UPE load balance taking the entire network load into account. Thus, the MME/UPE selection should be able to perform when an UE attaches to the network.

In order to make a MME/UPE selection, we believe that the HSS is the right node to do. In general the HSS has operation and maintenance interface and any location update signal always directs to their HSS so that operator can easily designate the MME/UPE per user basis dynamically. This function, designating the MME/UPE per user, also provides the significant benefit in order to configure topologically optimal based on both current user location and user locations in the passed.

Figure 10:
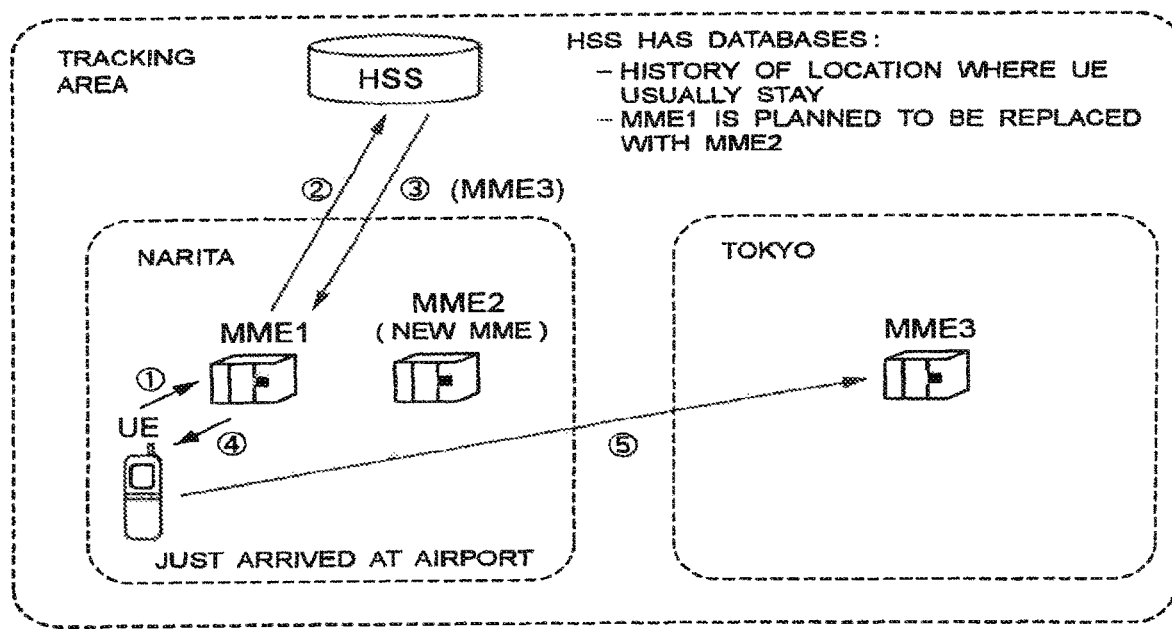
FIG. 10 illustrates the procedure for location update according to another exemplary embodiment of the invention, where the areas defined by the inner dotted lines are separated in the tracking area in terms of connection form.

FIG. 10 explains an example how location update procedure works conjunction with the database in HSS. In this example, the HSS knows two facts related to the subscriber's location update. One fact is that the UE usually stays in Tokyo area by referring his location update history. The other fact is that the MME1 in Narita is going to be replaces with MME2. Because of this situation, the HSS designates the MME3 as the alternative MME in the response of the location update signal so that UE can attach to the MME3.

As explained above, we believe that this small enhancement provides the significant benefits to the operator in order to maintain their network dynamically.

A UE/user needs to register with the network to receive services that require registration. This registration is described as Network Attachment. The always-on IP (Internet Protocol) connectivity for UE/users of the SAE system is enabled by establishing a basic IP bearer during Network Attachment.

The network keeps UE/user registration information. The UE/user registration information, e.g. the mapping between temporary and permanent user identities and the registered tracking area in the past, is kept by the network.

Figure 11:
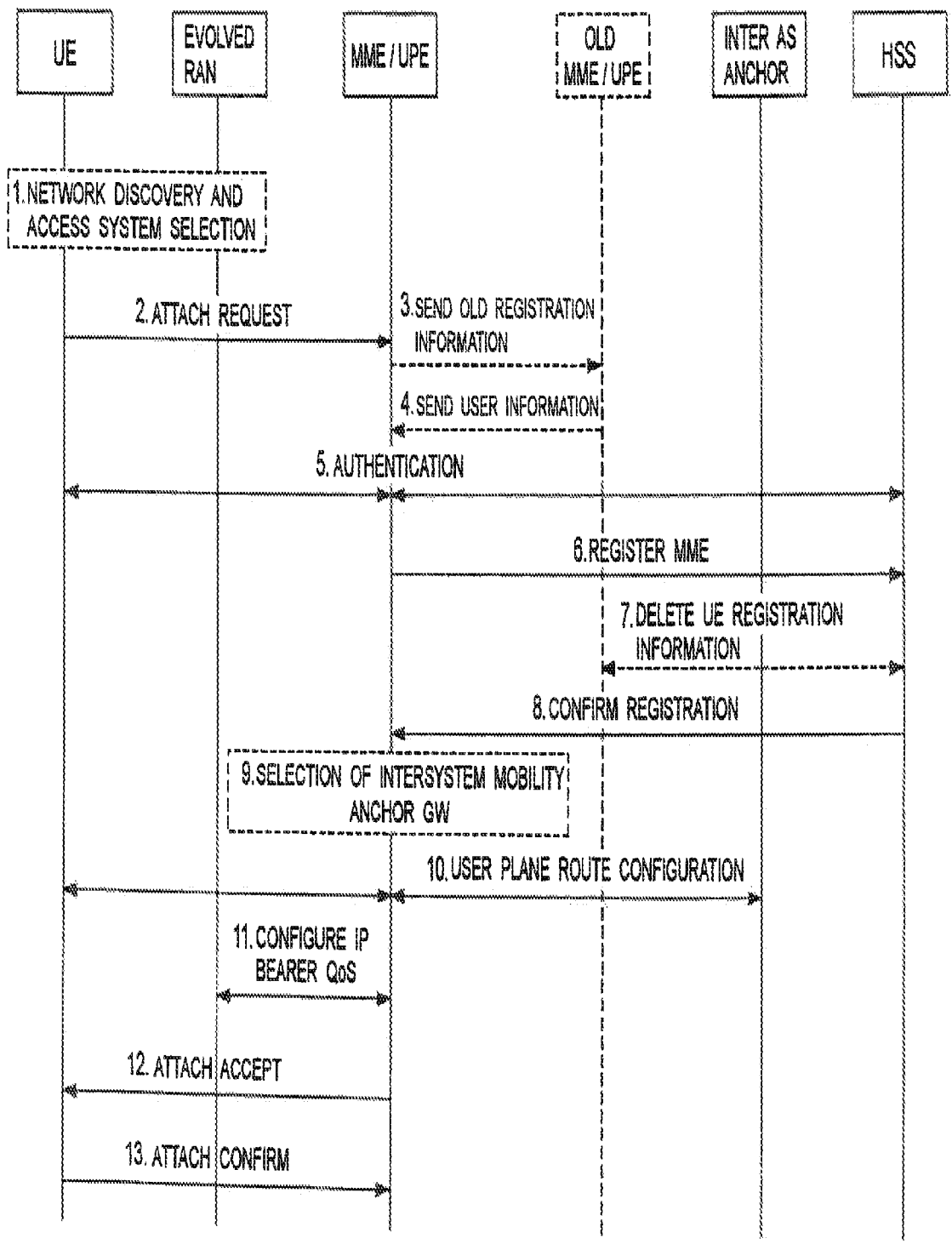
FIG. 11 shows an information flow for network attachment.

The information flow in FIG. 11 shows the network attachment of a UE. (The dashed entity is involved optionally.) MME and UPE are shown as combined; though they may be separate (in this case an additional interface it realized).

The steps shown in the information flow describe individual steps. This does not preclude any combining of multiple steps into one message or separating one step into a message sequence. The sequence of the steps shown in the information flow may change depending on the solutions for related key issues.

1) The UE discovers the SAE/LTE (Long Term Evolution) access system(s) and performs access system and network selection. If network sharing is present, a shared network may be selected.

2) The UE sends an attach request to the MME/UPE, including its old registration information, e.g. temporary identity. If the UE has no old registration information it includes its permanent identity.

In case of network sharing is applied the attach request includes information for selecting network or MME/UPE.

The Evolved RAN (Radio Access Network) selects the MME/UPE.

The attach request may include information on Default IP Access Bearer (e.g. user preferred IP address and APN (Access Point Name)).

3) If old registration information was sent by the UE the MME/UPE tries to retrieve user information from the old MME/UPE by sending the old registration information.

4) The old MME/UPE sends user information, e.g. the permanent user identity, to the MME/UPE.

5) The user/UE is authenticated in the new MME/UPE.

6) The MME/UPE registers itself as serving the UE in the HSS. HSS may designate the other MME/UPE instead of one selected by Evolved RAN. New MME/UPE is informed with the negative response to the UE.

7) The user/UE information in the old MME/UPE is deleted or the user/UE is marked as not present.

8) The HSS confirms the registration of the new MME/UPE. Subscription data authorising the Default IP Access Bearer are transferred. Information for policy and charging control of the Default IP Access Bearer is sent to the MME/UPE.

9) An Inters AS (Access Stratum) Anchor is selected. The IP address configuration is determined by user preferences received from the UE, by subscription data, or by HPLMN (Home Public Land Mobile Network) or VPLMN (Visited Public Land Mobile Network) policies.

10) The Inter AS Anchor configures the IP layer with the determined user IP address. The user plane is established and the default policy and charging rules are applied. The user plane establishment is initiated by the UE or by the MME/UPE.

11) The MME/UPE provides the Evolved RAN with QoS (Quality Of Service) configurations for the Default IP Access Bearer, e.g. the upper limits for transmission data rates. This provision of QoS configuration may require an additional trigger, e.g. the need to transfer uplink or downlink user data.

12) The MME/UPE accepts the UE's network attachment and allocates a temporary identity to the UE. Also the determined user IP address is transferred.

13) Roaming restrictions are checked and if violated the network attachment is rejected.

14) The UE acknowledges the success of the network attachment.

Figure 12:
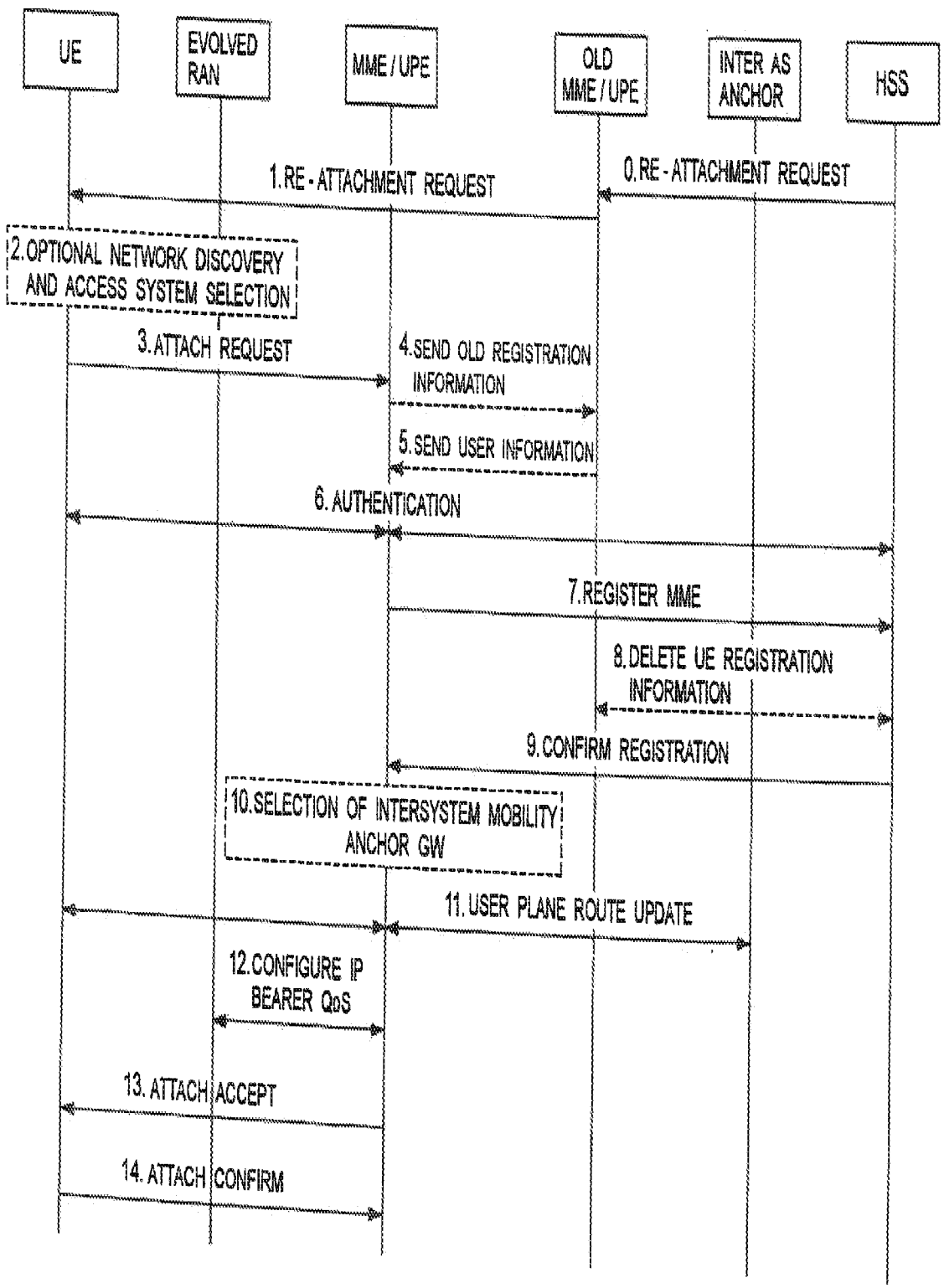
FIG. 12 shows an information flow for re-attachment initiated by a network.

It shall be possible for an HSS to trigger the UE to reattach (for reasons like load redistribution, attachment to a topologically more optimal MME/UPE due to current user location etc.). In this case, the procedure of FIG. 12 is applied.

0) The HSS requests the UE to re-attach to the other MME/UPE. New MME/UPE information is set on the re-attachment request message.

1) The Old MME/UPE relays the re-attach request to the UE.

2) The UE discovers the SAE/LTE (Long Term Evolution) access system(s) and perform access system and network selection. However, this could be skipped in the case of Re-attachment required to move the UE to a topologically more optimal MME/UPE.

3) The UE sends an attach request to the MME/UPE, including its old registration information, e.g. temporary identity. If the UE has no old registration information it includes its permanent identity.

In case of network sharing is applied the attach request includes information for selecting network or MME/UPE.

The Evolved RAN selects the MME/UPE.

The attach request may include information on Default IP Access Bearer (e.g. user preferred IP address and APN).

4) If old registration information was sent by the UE the MME/UPE tries to retrieve user information from the old MME/UPE by sending the old registration information.

5) The old MME/UPE sends user information, e.g. the permanent user identity, to the MME/UPE.

6) The user/UE is authenticated in the new MME/UPE.

7) The MME/UPE registers itself as serving the UE in the HSS.

8) The user/UE information in the old MME/UPE is deleted or the user/UE is marked as not present.

9) The HSS confirms the registration of the new MME/UPE. Subscription data authorising the Default IP Access Bearer are transferred. Information for policy and charging control of the Default IP Access Bearer is sent to the MME/UPE.

10) An Inters AS Anchor is selected.

11) The Inter AS Anchor configures the IP layer with the determined user IP address. The user plane is established and the default policy and charging rules are applied. The user plane establishment is initiated by the UE or by the MME/UPE.

12) The MME/UPE provides the Evolved RAN with QoS configurations for the Default IP Access Bearer, e.g. the upper limits for transmission data rates. This provision of QoS configuration may require an additional trigger, e.g. the need to transfer uplink or downlink user data.

13) The MME/UPE accepts the UE's network attachment and allocates a temporary identity to the UE. Also the determined user IP address is transferred.

Roaming restrictions are checked and if violated the network attachment is rejected.

14) The UE acknowledges the success of the network attachment.

The re-attach procedure may include IP address re-allocation and Inter AS Anchor re-selection. The UE may not change IP address and Inter AS Anchor during re-attach procedure.

The processing operations of the HSS in accordance with the sequence charts shown in FIGS. 3, 4, 11 and 12 as well as the ones in accordance with the flowchart shown in FIG. 9 can be realized by a program prestored in a storage medium such as ROM being read and executed by a computer which serves as a CPU (or control section) in the HSS.

An exemplary advantage according to the invention is that efficient operation and management of networks can be realized by utilizing flexibility of a network which allows free combination of a base station and an AGW.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. A method for a server in a communication system comprising:
storing subscription information on a user equipment (UE); and
providing the subscription information for a first communication apparatus selected by a base station,
wherein based on the subscription information, a signal for registration of the UE sent by the UE is forwarded to second communication apparatus that is different from the first communication apparatus via the base station.

2. A server in a communication system comprising:
a processor configured to store subscription information on a user equipment (UE); and
a transmitter configured to provide the subscription information for a first communication apparatus selected by a base station,
wherein based on the subscription information, a signal for registration of the UE sent by the UE is forwarded to a second communication apparatus that is different from the first communication apparatus via the base station.

3. A method for a user equipment (UE) in a mobile communication system, the method comprising:
sending a first signal, related to a location of the UE, to a base station; and
receiving a second signal, related to a location of the UE, from an communication apparatus via the base station,
wherein the base station selects a first communication apparatus for the UE upon receiving the first signal and sends the first signal to the first communication apparatus,
wherein the base station resends the first signal to a second communication apparatus, different from the first communication apparatus, based on subscription information on the UE provided by a server, and
wherein the UE receives the second signal from the second communication apparatus via the base station.

4. A user equipment (UE) in a mobile communication system, the UE comprising:
a transmitter configured to send a first signal, related to a location of the UE, to a base station; and
a receiver configured to receive a second signal, related to a location of the UE, from an communication apparatus via the base station,
wherein the base station selects a first communication apparatus for the UE upon receiving the first signal and sends the first signal to the first communication apparatus,
wherein the base station resends the first signal to a second communication apparatus, different from the first communication apparatus, based on subscription information on the UE provided by a server, and
wherein the UE receives the second signal from the second communication apparatus via the base station.

* * * * *

UNITED STATES PATENT AND TRADEMARK OFFICE
CERTIFICATE OF CORRECTION

| | |
|---|---|
| PATENT NO. | : 11,368,832 B2 |
| APPLICATION NO. | : 16/997923 |
| DATED | : June 21, 2022 |
| INVENTOR(S) | : Toshiyuki Tamura |

It is certified that error appears in the above-identified patent and that said Letters Patent is hereby corrected as shown below:

In the Claims

In Column 13, Line 6, Claim 3, please delete "an" and insert --a-- after "from"

In Column 14, Line 4, Claim 4, please delete "an" and insert --a-- after "from"

Signed and Sealed this
Thirty-first Day of January, 2023

Katherine Kelly Vidal
*Director of the United States Patent and Trademark Office*